J. F. DE NAVARRO.
Improvement in Water-Meters with Stop-Cock Connections.
No. 114,419.                                   Patented May 2, 1871.
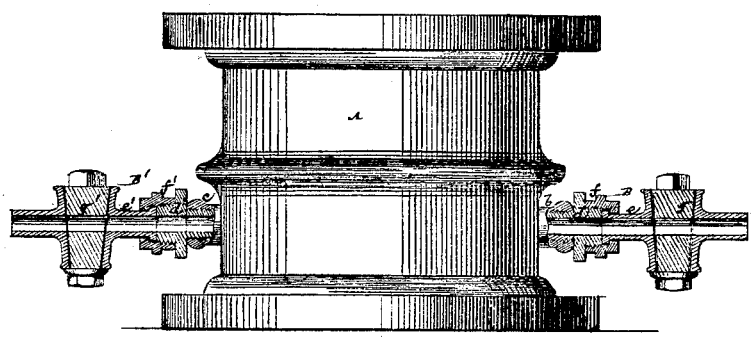

UNITED STATES PATENT OFFICE.

JOSE F. DE NAVARRO, OF NEW YORK, N. Y.

Letters Patent No. 114,419, dated May 2, 1871.

IMPROVEMENT IN WATER-METERS WITH STOP-COCK CONNECTIONS.

The Schedule referred to in these Letters Patent and making part of the same.

*To all whom it may concern:*

Be it known that I, JOSÉ F. DE NAVARRO, of the city, county, and State of New York, have invented a new and useful Improvement in Connections for Water-Meters, of which the following is a full, clear, and exact description, reference being had to the accompanying drawing forming part of this specification, and which represents a side elevation of a water-meter with my improved connection applied thereto in section.

My invention, although mainly designed to be applied to water-meters, and the same will here be described accordingly, is equally applicable to meters for measuring other liquids or fluids, and is not restricted to any particular kind of meter.

My invention consists in constructing the union couplings, by which the connection is made with the supply and service-pipes, with cocks, whereby the water may be retained in said pipes when disconnecting the meter.

Ordinarily, water-meters are connected with their supply and service-pipes by union couplings of the usual construction, the one-half of each coupling being screwed into the inlet and exhaust-orifices of the meter, and the other half being soldered to the supply and service-pipes, and the two halves of each coupling being connected by the usual nuts, which, on being unscrewed, admit of the detachment of the meter with the one-half of each coupling attached to it, but with no provision for retaining the water in the pipes or of shutting it off, except by closing the cock that controls the admission from the main, and which is generally placed at a considerable distance from the meter, so that, when detaching the meter, not only is the water in the service-pipe wasted or left free to escape, frequently producing damage, but also the water in the supply-pipe similarly exposed.

My invention, by providing the couplings themselves with cocks, does away with all escape of the water from both the supply and service-pipes when detaching the meter, and allows of the connection of the latter when the pipes are full.

In the accompanying drawing—

A represents a meter;

*b*, its inlet-orifice or nozzle; and

*c*, its outlet; or these openings may be reversed relatively to the supply and service-pipes, and either be in the same or different lines.

*d* and *d'* are the halves or portions of the union couplings B B', which screw into the inlet and outlet. nozzles *b c;* and

*e e'* the other halves or portions thereof, to which the supply and service-pipes are soldered.

*f f'* are the coupling-nuts.

The cocks *g g'*, by which the water is shut off from escaping both from the service and supply-pipes when detaching the meter, are arranged in and made to form part of the halves or portions *e e'* of the couplings themselves, which is a feature of the invention.

It will be perceived that neither the meter nor the cock is alleged to be novel in its construction, and that even in the mode of connection novelty is not necessarily requisite, since the primary idea of the invention is the facility of detaching the meter by means of the constant presence and adaptation of cocks for controlling the flow to permit the removal or regulation of the meter.

I therefore claim—

1. A meter provided with cocks at its influx and efflux, substantially as described.

2. In combination with a meter so provided, the flanged portion *e* or *e'* of the cock, forming part of said cock.

J. F. DE NAVARRO.

Witnesses:
FRED. HAYNES,
R. E. RABEAU.